United States Patent
Göbelt et al.

(10) Patent No.: US 9,957,343 B2
(45) Date of Patent: *May 1, 2018

(54) IONIC BONDING GROUP-CONTAINING COMB POLYMERS

(71) Applicant: BYK-Chemie GmbH, Wesel (DE)

(72) Inventors: Bernd Göbelt, Wesel (DE); Jürgen Omeis, Dorsten-Lembeck (DE); René Nagelsdiek, Hamminkeln (DE); Marcus Meichsner, Kamp-Lintfort (DE)

(73) Assignee: BYK-Chemie, GmbH, Wesel (DE)

( * ) Notice: Subject to any disclaimer, the term of this patent is extended or adjusted under 35 U.S.C. 154(b) by 599 days.

This patent is subject to a terminal disclaimer.

(21) Appl. No.: 14/407,657

(22) PCT Filed: Jun. 4, 2013

(86) PCT No.: PCT/EP2013/001626
§ 371 (c)(1),
(2) Date: Dec. 12, 2014

(87) PCT Pub. No.: WO2013/189568
PCT Pub. Date: Dec. 27, 2013

(65) Prior Publication Data
US 2015/0152211 A1     Jun. 4, 2015

(30) Foreign Application Priority Data

Jun. 21, 2012 (EP) .................................. 12004659

(51) Int. Cl.
*C08F 267/04* (2006.01)
*C08F 267/02* (2006.01)
(Continued)

(52) U.S. Cl.
CPC .............. *C08F 267/04* (2013.01); *C08F 8/14* (2013.01); *C08F 8/44* (2013.01); *C08F 18/16* (2013.01); *C08F 220/06* (2013.01); *C08F 220/34* (2013.01); *C08F 267/02* (2013.01); *C08F 283/06* (2013.01); *C08F 293/00* (2013.01); *C08L 51/003* (2013.01); *C09D 151/003* (2013.01); *C08F 18/14* (2013.01); *C08F 20/26* (2013.01); *C08F 20/34* (2013.01); *C08F 20/36* (2013.01); *C08F 20/58* (2013.01); *C08F 20/60* (2013.01); *C08F 212/08* (2013.01); *C08F 218/14* (2013.01); *C08F 218/16* (2013.01); *C08F 220/58* (2013.01); *C08F 220/60* (2013.01); *C08F 222/06* (2013.01); *C08F 222/08* (2013.01); *C08F 222/20* (2013.01); *C08F 222/22* (2013.01); *C08F 2220/283* (2013.01); *C08F 2220/285* (2013.01); *C08F 2220/286* (2013.01); *C08F 2220/287* (2013.01); *C08F 2220/288* (2013.01); *C08F 2220/305* (2013.01); *C08F 2220/306* (2013.01); *C08F 2220/307* (2013.01); *C08F 2220/308* (2013.01); *C08F 2220/346* (2013.01); *C08F 2220/603* (2013.01); *C08F 2220/606* (2013.01); *C08F 2222/205* (2013.01); *C08F 2222/225* (2013.01); *C08L 87/005* (2013.01)

(58) Field of Classification Search
CPC ........ C08F 267/04; C08F 267/02; C08F 8/14;
C08F 8/44; C08F 220/26; C08F 220/34;
C08F 220/58; C08F 220/60; C08F 20/26;
C08F 20/34; C08F 20/36; C08F 20/58;
C08F 20/60; C08F 20/1814; C08F 20/16;
C08F 218/14; C08F 218/16; C08F
222/06; C08F 222/08; C08F 222/22;
C08F 222/20; C08F 2222/225; C08F
2222/205; C08F 2220/283; C08F
2220/285; C08F 2220/286; C08F
2220/287; C08F 2220/288; C08F
2220/305; C08F 2220/306; C08F
2220/307; C08F 2220/308; C08F
2220/603; C08F 2220/346; C08F
2220/606
See application file for complete search history.

(56) References Cited

U.S. PATENT DOCUMENTS 3,095,390 A * 6/1963 Maeder .................... C08F 20/60
                                                                    524/245
3,262,917 A * 7/1966 Maeder ................ A61K 8/8158
                                                                    424/47
(Continued)

FOREIGN PATENT DOCUMENTS

DE      10 2006 062 441 A1      7/2008
DE      10 2008 021 511 A1      11/2009
(Continued)

OTHER PUBLICATIONS

PCT/EP2013/001626—International Search Report, dated Jul. 1, 2013. English Translation.
(Continued)

*Primary Examiner* — Ling Choi
*Assistant Examiner* — David L Miller
(74) *Attorney, Agent, or Firm* — Curatolo Sidoti Co., LPA; Joseph G. Curatolo; Salvatore A. Sidoti

(57) ABSTRACT

The invention relates to a copolymer that can be used as wetting agent and dispersant and contains i) 40-73 mole percent of a base structural unit (A) and ii) 27-60 mole percent of a substituted dicarboxylic acid derivative structural unit (B), the structural unit (B) containing species having a bisamide structure and species having quaternized amino groups.

17 Claims, No Drawings

(51) Int. Cl.
*C08F 18/16* (2006.01)
*C08F 220/06* (2006.01)
*C08F 283/06* (2006.01)
*C08F 293/00* (2006.01)
*C08L 51/00* (2006.01)
*C09D 151/00* (2006.01)
*C08F 8/14* (2006.01)
*C08F 8/44* (2006.01)
*C08F 220/34* (2006.01)
*C08F 220/30* (2006.01)
*C08F 222/08* (2006.01)
*C08F 222/22* (2006.01)
*C08F 220/28* (2006.01)
*C08F 20/26* (2006.01)
*C08F 218/16* (2006.01)
*C08F 222/20* (2006.01)
*C08F 218/14* (2006.01)
*C08F 220/58* (2006.01)
*C08F 20/60* (2006.01)
*C08F 20/58* (2006.01)
*C08F 18/14* (2006.01)
*C08F 220/60* (2006.01)
*C08F 20/36* (2006.01)
*C08F 222/06* (2006.01)
*C08F 20/34* (2006.01)
*C08F 212/08* (2006.01)
*C08L 87/00* (2006.01)

(56) References Cited

U.S. PATENT DOCUMENTS

| | | | |
|---|---|---|---|
| 4,647,647 A | 3/1987 | Haubennestel et al. |
| 6,423,785 B1 | 7/2002 | Esselborn et al. |
| 6,444,776 B1 | 9/2002 | Holland et al. |
| 7,078,464 B2 | 7/2006 | Schmidhauser et al. |
| 7,851,515 B2 | 12/2010 | Salz et al. |
| 8,129,476 B2 | 3/2012 | Göbelt et al. |
| 9,556,299 B2 * | 1/2017 | Nagelsdiek ............... C08F 8/32 |
| 2006/0069224 A1 | 3/2006 | Pritschins et al. |
| 2006/0130701 A1 | 6/2006 | Salz et al. |
| 2010/0022662 A1 | 1/2010 | Göbelt et al. |
| 2010/0130678 A1 | 5/2010 | Richards |
| 2011/0046274 A1 | 2/2011 | Plueg et al. |

FOREIGN PATENT DOCUMENTS

| | | |
|---|---|---|
| DE | 10 2008 041 790 A1 | 3/2010 |
| EP | 1 026 178 A1 | 8/2000 |
| EP | 1 640 389 A1 | 3/2006 |
| EP | 1 674 067 A1 | 6/2006 |
| WO | WO 2008/080580 A2 | 7/2008 |
| WO | WO 2008/122606 A2 | 10/2008 |
| WO | WO 2012/175158 A1 | 12/2012 |

OTHER PUBLICATIONS

PCT/EP2013/001626—International Written Opinion, dated Jul. 1, 2013.
PCT/EP2013/001626—International Preliminary Report on Patentability, dated Jun. 18, 2014. English Translation.

* cited by examiner

IONIC BONDING GROUP-CONTAINING COMB POLYMERS

CROSS REFERENCE TO RELATED APPLICATIONS

This application is a national stage application of International Application No. PCT/EP2013/001626, filed 4 Jun. 2013, which claims priority from European Patent Application No. 12004659.4, filed 21 Jun. 2012, from which applications priority is claimed, and which are incorporated herein by reference.

The present invention relates to a copolymer, to the preparation of the copolymer, to a dispersion, to a particle preparation and to the use of the copolymer.

Comb copolymers with different side chain types are frequently used as wetting and dispersing agents for dispersions containing particles. As a rule, such comb polymers contain a relatively small proportion by weight of bonding group side chains that interact with particle surfaces, since said side chains have a relatively low molecular weight compared to the other side chains, for the purpose of ensuring the stability of the dispersion. On the other hand, an insufficient bonding group content also often prevents the stabilization of the particle dispersions.

A typical comb copolymer with corresponding different side chains, which can be used as wetting and dispersing agents, is based on copolymers with structural units of monoethylenically unsaturated dicarboxylic acids or their anhydrides. Common representatives of this type are comb copolymers based on so-called styrene/maleic acid anhydride resins (SMA resins).

U.S. Pat. No. 7,078,464 describes wetting and dispersing agents of the SMA resin type, which can be produced by grafting SMA resins with polyether amines and dialkylaminoalkylamines. Due to subsequent salting of the free amino groups with unsaturated carboxylic acids, succinic acid amide substructures are produced.

WO 2008/080580 relates to wetting and dispersing agents based on SMA resins reacted with polyether monoamines and dialkylaminoalkylamines, wherein the bonding groups produced, which are in the form of tertiary amino groups, can be quaternized at least partially. In WO 2008/122606, similar SMA resin types with a low relative content of maleic acid anhydride structural units are described. In the documents DE-A 10 2008 021511, EP-A 1 640 389, EP-A 1 026 178 as well as DE-A 10 2008 041790, corresponding additional similar copolymer types/applications are described.

The above-mentioned comb copolymers are successfully used in practice as wetting and dispersing agents, but their stabilizing effect in dispersions containing particles needs to be further improved.

The problem of the present invention therefore is to provide a qualitatively high-grade wetting and dispersing agents having particularly good properties with regard to the stabilization of dispersions containing particles.

The solution of this problem is a copolymer containing
i) 40-73 mole percent of a base structural unit (A) and
ii) 27-60 mole percent of a substituted dicarboxylic acid derivative structural unit (B), wherein the base structural unit (A) is generated by reacting a monomer (a) containing an olefinic double bond as well as no species falling under the dicarboxylic acid derivative structural unit (B),
the substituted dicarboxylic acid derivative structural unit (B) is present according to one or more of the general formulas of the group consisting of (I-1), (I-2), (I-3), (I-4), (I-5), (I-6), (II-1), (II-2), (II-3), (III-1), (III-2), (III-3), (IV-1) and (IV-2)

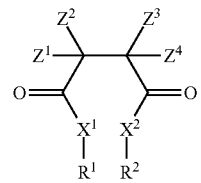

I-1

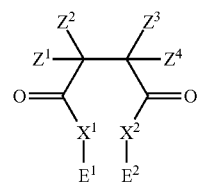

I-2

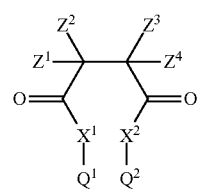

I-3

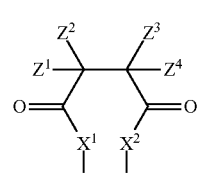

I-4

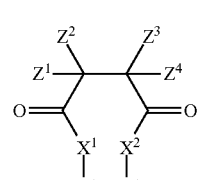

I-5

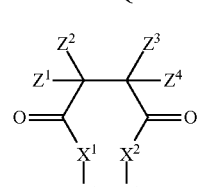

I-6

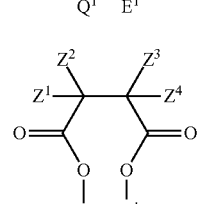

II-1

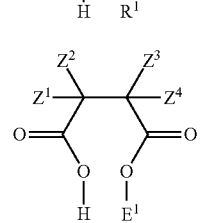

II-2

-continued

II-3

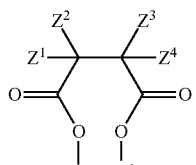

III-1

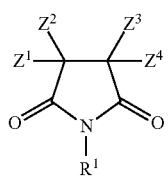

III-2

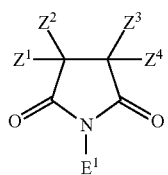

III-3

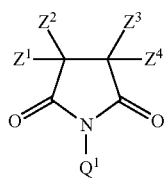

IV-1

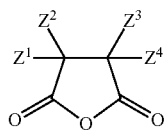

IV-2

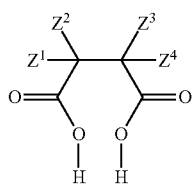

with

Z1, Z2, Z3 and Z4 in each case identical or different and in each case independently of one another represented by hydrogen, a linear $C_1$-$C_4$ alkyl residue and/or polymer main chain linking sites, with the condition that, for each general formula, there are exactly two polymer main chain linking sites, $X^1$ and $X^2$ in each case identical or different and in each case independently of one another represented by NH and/or O, $R^1$ and $R^2$ in each case identical or different and in each case independently of one another represented by a branched or unbranched, saturated or unsaturated, organic residue containing at least four carbon atoms as well as at least three oxygen atoms, and which comprises no amine functions and no ammonium functions, $E^1$ and $E^2$ in each case identical or different and in each case independently of one another represented by an N,N-disubstituted amine residue of general formula (V-E)

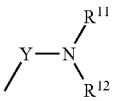
(V-E)

with $R^{11}$, $R^{12}$ in each case identical or different and in each case independently of one another represented by a substituted or unsubstituted, branched or unbranched, $C_1$-$C_{24}$ alkyl group, by a substituted or unsubstituted $C_4$-$C_{10}$ cycloalkyl group, by a substituted or unsubstituted $C_6$-$C_{18}$ aryl group and/or a substituted or unsubstituted, branched or unbranched $C_7$-$C_{18}$ arylalkyl group, where $R^{11}$ and $R^{12}$ together with the N atom binding $R^{11}$ and $R^{12}$ can form an aromatic or aliphatic, substituted or unsubstituted, cyclic $C_3$-$C_{10}$ group, Y identical or different and represented by a substituted or unsubstituted, branched or unbranched, $C_1$-$C_{24}$ alkylene group and/or a substituted or unsubstituted $C_6$-$C_{18}$ arylene group $Q^1$ and $Q^2$ in each case identical or different and in each case independently of one another represented by a quaternary ammonium residue of general formula (V-Q)

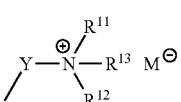
(V-Q)

with $R^{11}$, $R^{12}$ of the same equivalence as in the general formula (V-E), Y of the same equivalence as in the general formula (V-E), $R^{13}$ identical or different and represented by hydrogen, by a substituted or unsubstituted, branched or unbranched, $C_1$-$C_{24}$ alkyl group, by a substituted or unsubstituted $C_4$-$C_{10}$ cycloalkyl group, by a substituted or unsubstituted $C_6$-$C_{18}$ aryl group and/or a substituted or unsubstituted, branched or unbranched, $C_7$-$C_{18}$ arylalkyl group, $M^-$ identical or different and represented by an anion, wherein the molar fraction of the structural units that are part of the group consisting of (I-1), (I-2), (I-3), (I-4), (I-5) and (I-6) is 5-100%, relative to the totality of the structural units to be attributed to the dicarboxylic acid derivative structural unit (B), the molar fraction of the structural units that are part of the group consisting of (I-2), (I-3), (I-4), (I-5), (I-6), (II-2), (II-3), (III-2) and (III-3) is 5-100%, relative to the totality of the structural units to be attributed to the dicarboxylic acid derivative structural unit (B), and, regarding the dicarboxylic acid derivative structural unit (B), the molar fraction of the substituents that are part of the group consisting of $Q^1$ and $Q^2$ is 10-100%, relative to the totality of the substituents that are part of the group consisting of $E^1$, $E^2$, $Q^1$ and $Q^2$.

The copolymer according to the invention can be in a completely or partially salted form, depending on its environment.

The statement "Z1, Z2, Z3 and Z4 in each case identical or different and in each case independently of one another represented by hydrogen, by a linear $C_1$-$C_4$ alkyl residue and/or by polymer main chain linking sites, with the condition that, for each general formula, exactly two polymer main chain linking sites are present" expresses that the species of the dicarboxylic acid derivative structural unit (B) are bivalent structural units, in each case present either on the basis of maleic acid derivatives or on the basis of itaconic acid derivatives.

In the case of a maleic acid derivative incorporated by polymerization, either Z1 or Z2 and either Z3 or Z4 are present as connectivities (links in the chain). This corresponds to a preferred embodiment of the invention and, as a rule, it is present in all the species of the dicarboxylic acid derivative structural unit (B).

In the case of an itaconic acid derivative incorporated by polymerization, on the other hand, either Z1 and Z2, or alternatively Z3 and Z4, are present as connectivities. In principle, the possibility also exists for the copolymer according to the invention to comprise both corresponding maleic acid derivatives and also corresponding itaconic acid derivatives.

The copolymer according to the invention is a qualitatively high-grade wetting and dispersing agents, in particular for solid particles such as pigments and fillers (liquid-solid boundary surface).

The particularly good universal usability as wetting and dispersing agents of the copolymer according to the invention is determined quite essentially by the disubstituted dicarboxylic acid derivative structural units (B) of type B-I (comprising (I-1), (I-2), (I-3), (I-4), (I-5), (I-6)) contained in the copolymer according to the invention. This is probably also connected with the fact that, among other factors, these disubstituted species of type B-I, in comparison to the species of types B-II and B-III each substituted only once, produce a higher content of side chains or bonding groups in the copolymer.

The content of bonding groups (made available by the substituents $E^1$, $E^2$, $Q^1$ and $Q^2$) has a crucial influence on the binder compatibility as well as on the interaction with relevant solid substance surfaces.

As bonding groups, quaternary ammonium salt structures frequently exhibit other properties, in comparison to tertiary amine structures, as a result of which, as a rule, the universality of the wetting and dispersing agents is improved.

For example, quaternary ammonium salt structures usually have a better interaction with organic pigments that carry neutralized acid functions on the surface. Frequently, a mixture of ammonium salt structures and of tertiary amine structures is also found to be advantageous, in particular even if only a relatively small content of ammonium salt structures is present.

As a result of the base structural unit (A), the long side chains (in particular of the structural unit (B)) are "kept at a distance" (depending on the grafting density/grafting conversion), and moreover depending on the selection of the monomer (a) producing the base structural unit (A), the polarity or affinity of the copolymer according to the invention is influenced in a controlled manner.

In principle, by a suitable selection of the bivalent structural units (A) and (B), the respective desired property as wetting and dispersing agents can be provided. It is not preferable, but also not ruled out, that the copolymer according to the invention comprises additional bivalent structural units, in addition to the structural units (A) and (B).

In a preferred embodiment of the invention, the copolymer according to the invention contains i) 48-70, preferably 50-67 mole percent of the base structural unit (A) and ii) 30-52, preferably 33-50 mole percent of the substituted dicarboxylic acid derivative structural unit (B).

Corresponding contents of the structural units (A) and (B) in the copolymer according to the invention ensure that an effectively optimal density of bonding groups ($E^1$, $E^2$, $Q^1$ and $Q^2$) can be achieved.

The copolymer according to the invention preferably contains 12-500, preferably 20-200 structural units which are selected from the base structural unit (A) and the dicarboxylic acid derivative structural unit (B).

Typically, in the copolymer according to the invention, it is implemented that the molar fraction of the structural units which are part of the group consisting of (I-1), (I-2), (I-3), (I-4), (I-5) and (I-6) is 10-80, preferably 25-75%, relative to the totality of the structural units that are to be attributed to the dicarboxylic acid derivative structural unit (B), the molar fraction of the structural units which are part of the group consisting of (I-2), (I-3), (I-4), (I-5), (I-6), (II-2), (II-3), (III-2) and (III-3) is 10-90, preferably 20-80%, relative to the totality of the structural units that are to be attributed to the dicarboxylic acid derivative structural unit (B), and with regard to the dicarboxylic acid derivative structural unit (B), the molar fraction of the substituents that are part of the group consisting of $Q^1$ and $Q^2$ is 20-95, preferably 25-90%, relative to the totality of the substituents that are part of the group consisting of $E^1$, $E^2$, $Q^1$ and $Q^2$.

Usually, the monomer (a) that produces the base structural unit (A) and contains an olefinic double bond is selected from one or more of the monomers of the group consisting of alkyl(meth)acrylates as well as alkenyl(meth)acrylates of straight-chain, branched or cycloaliphatic monoalcohols having 1 to 22 carbon atoms or of straight-chain or branched aromatic or mixed aromatic-aliphatic monoalcohols having 1 to 22 carbon atoms, mono(meth)acrylates of oligomeric or polymeric ethers, (meth)acrylates of halogenated alcohols; oxirane-containing (meth)acrylates, styrene, substituted styrenes, α-olefins, vinyl ethers, allyl ethers; methacrylonitrile, acrylonitrile; cycloaliphatic heterocyclic compounds comprising vinyl groups and having at least one N-atom as ring member, vinyl esters of monocarboxylic acids having 1 to 20 carbon atoms, N-alkyl- and N,N-dialkyl-substituted acrylamides with straight-chain, branched or cycloaliphatic alkyl groups having 1-22 carbon atoms, ethylenically unsaturated monomers with at least one carboxylic acid, phosphonic acid, phosphoric acid and/or sulfonic acid group and unsaturated fatty acids.

Species of the mentioned basic types of monomer (a) that have not been mentioned individually above can be used, for example:

methyl(meth)acrylate, ethyl(meth)acrylate, n-butyl(meth)acrylate, i-butyl(meth)acrylate, t-butyl(meth)acrylate, lauryl(meth)acrylate, 2-ethylhexyl(meth)acrylate, stearyl(meth)acrylate, tridecyl(meth)acrylate, cyclohexyl(meth)acrylate, isobornyl(meth)acrylate, allyl(meth)acrylate, t-butyl(meth)acrylate; aryl(meth)acrylates, substituted or unsubstituted benzyl(meth)acrylate, substituted or unsubstituted and phenyl(meth)acrylate, such as 4-nitrophenyl methacrylate; hydroxyalkyl(meth)acrylates of straight-chain, branched or cycloaliphatic diols having 2 to 36 carbon atoms, such as 3-hydroxypropyl methacrylate, 3,4-dihydroxybutyl monomethacrylate, 2-hydroxyethyl(meth)acrylate, 4-hydroxybutyl(meth)acrylate, 2-hydroxypropyl methacrylate, 2,5-dimethyl-1,6-hexanediol monomethacrylate, hydroxyphenoxypropyl methacrylate, mono(meth)acrylates of polyethylene glycols, polypropylene glycols or mixed polyethylene/propylene glycols, poly(ethylene glycol)methyl ether (meth)acrylate, poly(propylene glycol)methyl ether(meth)

acrylate having 5 to 80 carbon atoms, methoxyethoxyethyl (meth)acrylate, 1-butoxypropyl(meth)acrylate, cyclohexyloxymethyl(meth)acrylate, methoxymethoxyethyl (meth)acrylate, benzyloxymethyl(meth)acrylate, furfuryl (meth)acrylate, 2-butoxyethyl(meth)acrylate, 2-ethoxyethyl (meth)acrylate, allyloxymethyl(meth)acrylate, 1-ethoxybutyl(meth)acrylate, 1-ethoxyethyl(meth)acrylate, ethoxymethyl(meth)acrylate, caprolactone- and/or valerolactone-modified hydroxyalkyl(meth)acrylates with a molecular weight from 220 to 1200, wherein the hydroxy (meth)acrylates are preferably derived from straight-chain, branched or cycloaliphatic diols having 2 to 8 carbon atoms; perfluoroalkyl(meth)acrylates having 6 to 20 carbon atoms; oxirane-containing (meth)acrylates, preferably 2,3-epoxybutyl methacrylate, 3,4-epoxybutyl methacrylate, glycidyl (meth)acrylate, α-methylstyrene, 4-methylstyrene; 1-hexene, 1-heptene, 1-octene, 1-nonene, 1-decene, 1-undecene, 1-dodecene; 1-[2-(methacrylyloxy)ethyl]-2-imidazolidine, N-vinylpyrrolidone, N-vinylcaprolactam, vinyl acetate; N-(t-butyl)acrylamide, N,N-dimethylacrylamide, (meth) acrylic acid, carboxyethyl(meth)acrylate, citraconic acid, crotonic acid, cinammic acid, vinylsulfonic acid, 2-methyl-2-[(1-oxo-2-propenylamino]-1-propanesulfonic acid, styrenesulfonic acid, vinylbenzenesulfonic acid, vinylphosphonic acid as well as their esters, vinyl phosphoric acid as well as its esters, 2-(meth)acryloyloxyethyl phosphate, 3-(meth) acryoyloxypropyl phosphate, 4-(meth)acryloyloxybutyl phosphate, 4-(2-methacryloyloxyethyl)trimellitic acid and the acid groups mentioned in EP-A-1674067 as well as monomers comprising a polymerizable double bond.

After the polymerization has taken place, the respective structural units that are derived from these ethylenically unsaturated monomers can be further modified.

Thus, for example, oxirane structures can be reacted with nucleophilic compounds such as 4-nitrobenzoic acid. Hydroxy groups can be reacted with lactones such as ε-caprolactone, for example, to form polyesters, and from ester groups polymer, structural units having OH groups can be released by acid- or base-catalyzed ester cleavage.

Preferred monomers (a) are styrene and styrene derivatives, vinyl ethers, allyl ethers and vinyl heterocyclic compounds, wherein styrene is particularly preferable.

As a rule, at least 60 mole percent, preferably at least 90 mole percent, particularly preferably 100 mole percent of the structural units that are part of the base structural unit (I) can be generated by reaction of styrene.

The invention also relates to the preparation of the above-described copolymer, which is characterized in that first a copolymer precursor is produced by polymerization, wherein, by subsequent grafting, the substituents of type (I), (II) and/or (III) of the dicarboxylic acid derivative structural unit (B) are formed.

In a particularly preferable embodiment, the subsequent grafting is carried out by using procedures that get rid of reaction water, preferably by heating to a temperature of 120 to 200° C., until the molar fraction of the structural units that are part of the group consisting of (I-1), (I-2), (I-3), (I-4), (I-5) as well as (I-6) is at least 5%, preferably at least 10%, particularly preferably at least 25%, relative to the totality of the structural units that are to be attributed to the dicarboxylic acid derivative structural unit (B).

Subsequently, the quaternization or the partial quaternization of the relevant tertiary amino groups then typically occurs.

The preparation of the copolymer according to the invention thus occurs in practice by reacting copolymer precursors (hereafter referred to as main chain polymers) containing the monomer structural units (A) and (B*) with primary monoamines and/or monoalcohols which, in each case, contain at least one tertiary amino group. These tertiary amino groups are converted partially or completely into the quaternary ammonium salt. The conversion of the structural units of "(B*) type" into the "(B) types" occurs by esterification, amidation, imidation and quaternization reactions.

The number-average molecular weight (determination method gel permeation chromatography) of the main chain polymers is frequently between 1200 g/mol and 12,000 g/mol.

The main chain polymers can have a static, alternating, gradient-type or block-type structure.

Preferably, the main chain polymers (precursors) based on linear or branched maleic acid anhydride and usable for the preparation of the copolymers according to the invention can be prepared by radical-initiated polymerization, for example, with azo or peroxide initiators. In order to adjust the desired molecular weight, chain regulators (chain transfer agents), such as, for example, thiols, secondary alcohols or alkyl halides such as carbon tetrachloride can be added during the polymerization. Additional possible preparation methods relate to controlled radical polymerization methods. Depending on which controlled polymerization technique is optionally used, different copolymers are obtained even when using identical ethylenically unsaturated monomers and even when using the same molar ratios of the monomers, since different polymerization techniques can lead to different microstructures or to different sequences of the structural units.

In the process, the copolymers (precursors of the copolymer according to the invention) obtained are not necessarily defined by the polymerization regulator as end group. For example, the end group can be cleaved off entirely or partially after the polymerization. Thus, for example, it is possible to thermally cleave off the nitroxyl end group of the copolymers which were produced by NMP. Other production methods for producing the main chain polymers can be controlled radical polymerization methods. Depending on which controlled polymerization technique is used, different copolymers are obtained, even if identical ethylenically unsaturated monomers are used and even if the same molar ratios of the monomers are used, since the different polymerization techniques can lead to different microstructures or to different sequences of the structural units. Thus, for example, in the preparation of block copolymers by different techniques, using identical monomer mixtures, differently microstructured blocks can be obtained. In addition, the copolymers also can differ with regard to their molecular weight and their molecular weight distribution. The same also applies to gradient-type copolymers.

Moreover, these main chain polymers can be used in mixtures with AB block copolymers which have a block made of the main chain polymer. Here, the second block is constructed from styrene, and aryl- and alkyl-substituted acrylates and methacrylates.

As a rule, $R^1$ and $R^2$ are present in each case independently of one another as polyether residue, as polyester residue, as polyether polyester residue, as poly-2-alkyl-2-oxazoline residue, as poly-2-alkyl-2-oxazine residue and/or as polysiloxane residue.

Typically, $R^{11}$ and $R^{12}$ together with the $R^{11}$- and $R^{12}$-linking N atom jointly form an aromatic, substituted or unsubstituted heterocyclic compound comprising a total of two N atoms.

Usually, M⁻ is present as carboxylate, as phosphate, as phosphate monoester, as phosphate diester, as alkyl sulfonate, as sulfate and/or as halide.

The bonding groups are generated by reacting the structural unit (B*) of the main chain polymer with primary amines and/or alcohols (HX¹-E¹, HX²-E¹, HX¹-E² and/or HX²-E²) and subsequent quaternization or partial quaternization.

In concrete terms, the structural unit (B*) can be reacted with the following species:

N,N-disubstituted diamines of general structure R¹¹R¹²N—Y—NH₂

Examples thereof are N,N-dimethylaminoethylamine, N,N-dimethylaminopropylamine, N,N-diethylaminoethylamine and N,N-diethylaminopropylamine.

N,N-disubstituted amino alcohols of general structure R¹¹R¹²N—R³—OH.

Examples are dimethylaminoethanol and diethylaminoethanol.

basic heterocyclic compounds which carry a primary amine or alcohol function

Corresponding examples are 2-aminomethylpyridine, 4-aminomethylpyridine, N-aminopropylimidazole, 8-hydroxyquinoline, 4-(2-hydroxyethyl)morpholine, 1-(2-hydroxyethyl)pyrrolidine.

N,N-Disubstituted diamines of general structure R¹¹R¹²N—Y—NH₂ are preferable.

In order to produce the quaternary ammonium salt structures containing Q¹ and/or Q², the tertiary amino function of the above-described compounds can be reacted with alkylation agents. Suitable alkylation agents are alkyl and aralkyl halide sulfates, such as benzyl chloride, methyl iodide or dimethyl sulfate. Combinations of oxiranes and acids are also suitable as alkylation agents. In this context, examples of oxiranes are ethylene oxide, propylene oxide, butylene oxide, styrene oxide and glycidyl ethers, such as ethylhexyl glycidyl ether, phenylglycidyl ether and cresyl glycidyl ether.

Also suitable as reaction components for said structural unit (B*) are oligomers and polymers that carry a monofunctional amino and/or hydroxyl function (HX¹—R¹, HX²—R¹, HX¹—R² and/or HX²—R²).

Examples thereof are:

Polyalkylene oxide monoamines that are C₁-C₄ alcohol-started polyethers that are constructed from ethylene oxide and/or propylene oxide and carry a primary amino group: the ratio by weight of ethylene oxide units to propylene oxide units is frequently between 5:95 and 100:1, preferably between 30:70 and 70:30. The number-average molecular weight of the polyalkylene oxide monoamines is typically between 500 g/mol and 3000 g/mol.

Monohydroxy-terminated polyethers: they can be prepared, for example, by alkoxylating monofunctional alcohols such as alkanols, cycloalkanols, phenols with alkylene oxides such as ethylene oxide, propylene oxide, butylene oxide, styrene oxide, aliphatic or aromatic glycidyl ethers such as isopropyl glycidyl ether, butyl glycidyl ether, allyl glycidyl ether, 2-ethylhexyl glycidyl ether, cresyl glycidyl ether and phenyl glycidyl ether. Mixtures of these raw materials can also be used. In the case of mixed polyethers, they can be arranged statistically, in gradient form or in blocks. These polyethers frequently have a number-average molecular weight (M$_n$) in the range from approximately 100 to 25,000, particularly frequently from 150 to 15,000, and particularly typically from 200 to 10,000 g/mol. Polyethers based on ethylene oxide, propylene oxide or their mixtures are preferable.

Monohydroxy-terminated polyester and polyether-polyester block copolymers: they are obtained by the polycondensation of one or more optionally alkyl substituted hydroxycarboxylic acids and/or ring opening polymerization of the corresponding lactones such as propiolactone, valerolactone, butyrolactone, caprolactone and/or substituted lactones by means of a monohydroxy starting component (as described in U.S. Pat. No. 4,647,647). They preferably have a number-average molecular weight from 150 to 5000 g/mol. The lactone polymerization is carried out by known methods, initiated, for example, with titanates, p-toluenesulfonic acid or dibutyltin dilaurate, at temperatures from approximately 70° C. to 180° C. Particularly preferable are polyesters based on ε-caprolactone, optionally in combination with δ-valerolactone.

Monohydroxy- or monoamino-terminated poly-2-alkyl-2-oxazolines or poly-2-alkyl-2-oxazines: poly-2-alkyl-2-oxazolines or poly-2-alkyl-2-oxazines are obtained by cationic, ring-opening polymerization of 2-alkyl-2-oxazolines or 2-alkyl-2-oxazines with initiators, such as para-toluenesulfonic acid, methyl tosylate or methyl triflate. The oxazolinium or oxazinium end groups resulting from living cationic polymerization mechanisms can be converted by alkaline hydrolysis via amino ester end group formation into the more stable hydroxyamides. An alternative pathway for preparing monohydroxy functional poly-2-alkyl-2-oxazolines or poly-2-alkyl-2-oxazines is polymerization with 2-(4-hydroxyphenyl)-N-methyl-2-oxazolinium trifluoromethane sulfonate as initiating species. The synthesis of amino-terminated polyoxazolines is described in U.S. Pat. No. 6,444,776, for example. The compatibility can be controlled by the selection of the alkyl substituents. Thus, for example, poly-2-ethyl-2-oxazoline is suitable for highly polar systems due to its water solubility, while, for example, poly-2-lauryl-2-oxazoline is compatible in apolar systems. If block copolymers are formed from 2-ethyl-2-oxazoline and 2-lauryl-2-oxazoline, then the polymers are characterized by a particularly broad compatibility. Such poly-2-alkyl-2-oxazolines or poly-2-alkyl-2-oxazines usually have a number-average molecular weight M$_n$ from 300 to 20,000 g/mol, preferably from 500 to 10,000 g/mol. Also usable, among other compounds, are various 2-oxazolines that optionally comprise additional functional groups. Such species are, for example, corresponding fatty acid-based 2-oxazolines.

Monohydroxy- or monoamino-terminated polysiloxanes:

The polysiloxanes can be described by the following general formula:

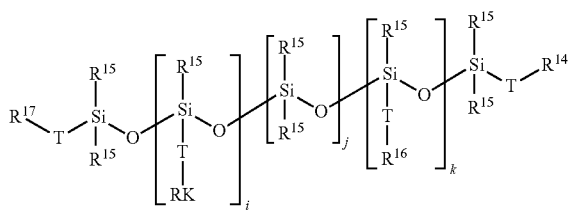

with

T=C₁-C₁₄ alkylene,

RK=unbranched polyether residue made of alkylene oxide units having 1-6 carbon atoms, and/or aliphatic and/or cycloaliphatic and/or aromatic polyester residue with a molecular weight between 200 and 4000 g/mol, $R^{14}$ and $R^{17}$ in each case independently represented by $C_1$-$C_{14}$ alkyl, aryl or aralkyl, —O($C_1$-$C_{14}$ alkyl, aryl or aralkyl), —OCO($C_1$-$C_{14}$ alkyl, aryl or aralkyl), —O—CO—O($C_1$-$C_{14}$ alkyl, aryl or aralkyl), —OSO$_2$($C_1$-$C_{14}$ alkyl, aryl or aralkyl), —H, —Cl, —F, —OH, —R, —RK, $R^{15}$=$C_1$-$C_{14}$ alkyl, aryl or aralkyl, $R^{16}$=polyhydroxy functional branched polyglycidol-polyether residue which consists of a branched polyglycidol group or contains said group, i=0-20, preferably 1-15, particularly preferably 1-8, j=2-300, preferably 10-200, particularly preferably 15-100, and k=0-20, preferably 1-15, particularly preferably 1-8, wherein, if C=0, then $R^{14}$=$R^{16}$ and/or $R^{17}$=$R^{16}$. If the unit —[Si$R^{15}$(Z—$R^{16}$)]—O— is present, i.e., if C is at least 1, then it is possible for $R^{14}$ and $R^{17}$ to be different from $R^{16}$.

The preparation of the copolymer according to the invention typically occurs in such a manner that, in the first step, the main chain polymer, which is optionally dissolved in a solvent, is reacted (at temperatures of preferably 120° C. to 200° C. with tertiary amine group-carrying primary amines and/or alcohols), so that anhydride structures are converted into succinic acid diamides, succinic acid diesters or succinic acid ester amides.

In the amidation and esterification reaction to form succinic acid diamide, succinic acid diester or succinic acid ester amide, reaction water is formed in each case. By removing the reaction water, the content of succinic acid diamide, succinic acid diester or succinic acid ester amide can be increased. Additionally, at high temperatures (in particular above 120° C.), succinic acid imide structures also form as additional structures. Moreover, the content of succinic acid diamides, succinic acid diesters or succinic acid ester amides depends on the starting quantity of polymeric monoamines and—alcohols with steric hindrance effect. The more polymeric monoamines and—alcohols are used, the smaller the content of succinic acid diamide, succinic acid diester or succinic acid ester amide structures formed becomes. Usually, the molar fraction of polymeric hydroxy and amino functional side chain molecules is at most 50 mole percent, relative to the total number of amines and alcohols that with (B*) form the structural unit (B).

A typical process principle according to the invention is explained below:

1 mol acid anhydride structure IV-1 reacts with 1 mol of the reactant types HX—R, HX-Q and/or HX-E already at room temperature to form structure II. By increasing the temperature above 120° C. (in particular above 150° C.), the structure III forms from II. If, beyond the first mol, an excess of reactants HX—R, HX-Q and/or HX-E is added to the acid anhydride structure IV-1 or the structures II and III, then the structures I-1 to I-6 form at temperatures above 100° C. (preferably above 120° C.). By adding suitable catalysts, the reaction can be accelerated and/or the reaction temperature can be selected to be lower. The removal of the reaction water which forms at the time of the formation of the structures I and III, for example, by the application of a vacuum, increases the content of structures I and III formed or it shortens the reaction times. By removal of volatile HX—R, HX-Q and/or HX-E by distillation, the structure I can be converted (slowly) into the structure type III, since the two structures are in chemical equilibrium. Moreover, the content of structure I is dependent on the starting quantity of polymer monoamines and monoalcohols R—XH with a steric hindrance effect. The more R—XH is used, the lower the content of succinic acid diamide, succinic acid diester or succinic acid ester amide structures I formed becomes, because, for steric reasons, the structural element I-1 is formed more slowly than the structures I-4 and I-5. Usually, the molar fraction of polymer hydroxy and amino functional side chain molecules is at most 50 mole percent, relative to the total number of amines and alcohols which together with (B*) form the structural unit (B).

At the time of the reaction, the added solvent can be removed again by distillation, for example in order to remove by azeotropoic distillation the water produced by the amidation and esterification. By determining the acid number, optionally the pyridine acid number and the amine number or the OH number, the content of succinic acid diamides, succinic acid diesters and succinic acid ester amides can be determined.

At reaction temperature, structure types I-III can be in a state of equilibrium. Thus, by adding the reactant types HX—R, HX-Q and/or HX-E, the structure type II and III can be converted into structure types I. However, it is also possible to convert the structure types I (slowly) into structure types III by removing volatile HX—R, HX-Q and/or HX-E by distillation.

The invention also relates to a dispersion which contains a dispersant medium as well as dispersed particulate solid substances, which is preferably in the form of an inorganic filler and/or in the form of an inorganic or organic pigment and/or in the form of carbon nanotubes and/or in the form of graphenes, wherein, relative to the total weight of the dispersion, 0.1-10 wt %, preferably 0.3 to 4.5 wt %, of the copolymer according to the invention is used as wetting and dispersing agents.

The dispersion according to the invention is preferably in the form of an ink or coating agent, in particular in the form of a lacquer.

The invention moreover relates to a particle preparation containing 30.0 to 99.9 wt % particulate solid substance as well as 0.1-70.0 wt % of the copolymer according to the invention.

Finally, the invention relates to the use of the copolymer according to the invention as wetting and dispersing agents.

The copolymer (comb copolymer) according to the invention is used, in particular in known fields of use of dispersants, for example, in the preparation or processing of lacquers, printing inks, paper coating, leather and textile paints, pastes, pigment concentrates, ceramics or cosmetic preparations, namely in particular when said products contain solid substances, such as pigments and/or fillers.

The copolymer according to the invention can also be used in the preparation or processing of casting and/or molding compositions based on synthetic, semisynthetic or natural macromolecular substances, such as polyvinyl chloride, saturated or unsaturated polyesters, polyurethanes, polystyrene, polyacrylate, polyamide, epoxide resins, polyolefins such as polyethylene or polypropylene. For example, corresponding copolymers can be used for the preparation of cast compositions, PVC plastisols, gel coats, polymer concrete, printed circuit boards, industry lacquers, wood and furniture lacquers, vehicle lacquers, ship paints, corrosion protection paints, can and coil coatings, painter's and construction lacquers. Examples of conventional binders are resins based on polyurethane, cellulose nitrate, cellulose acetobutyrate, alkyd, melamine, polyester, chloro rubber, epoxide and acrylate. Examples of water-based coatings are cathodic or anodic electroimmersion lacquers, for example, for car bodies. Further examples are plasters, silicate paints, dispersion paints, water lacquers based on water-dilutable alkyds, alkyd emulsions, hybrid systems, 2-component systems, polyurethane and acrylate dispersions.

The comb copolymers (copolymers according to the invention) are also particularly suitable as dispersant for producing solid substance concentrates, such as pigment concentrates. For this purpose, for example to start, the comb copolymers are placed in a carrier medium, such as organic solvents, plasticizers and/or water, and the solid substances to be dispersed are added under stirring. In addition, these concentrates can contain binders and/or other auxiliary substances. However, with the comb copolymer, it is also possible in particular to produce stable binder-free pigment concentrates. It is equally possible, with the polymers, to produce fluid solid substance concentrates from pigment press cakes. In the process, the comb copolymers are admixed with the compressed cake, which can still contain organic solvents, plasticizers and/or water, and the mixture obtained is dispersed. The solid substance concentrates prepared in various ways can then be incorporated in different substrates, such as, for example, alkyd resins, polyester resins, acrylate resins, polyurethane resins or epoxide resins. However, pigments can also be dispersed in a solvent-free manner directly into the comb copolymers, and they are then particularly suitable for pigmenting thermoplastic and duroplastic plastic formulations.

The comb copolymers can advantageously also be used in the preparation of inks for "nonimpact" printing methods, such as "thermal inkjet" and for the "bubble jet process." These inks can be, for example, aqueous ink formulations, solvent-based ink formulations, solvent-free or low-solvent inks for UV applications as well as wax-like inks.

The comb copolymers can advantageously also be used in the manufacture of color filters for liquid crystal displays, liquid crystal monitors, color resolution devices, sensors, plasma monitors, displays based on SED (Surface conduction Electron emitter Display) and for MLCC (Multi Layer Ceramic Compounds). Here, the liquid color filter lacquer, also referred to as color resist, can be applied by a great variety of application methods such as spin coating, coating with a doctor blade, a combination of the two or by "non impact" printing processes such as inkjet processes, for example. The MLCC technology is used in the preparation of microchips and printed circuit boards.

The comb copolymers can also be used for producing cosmetic preparations such as, for example, makeup, powder, lipsticks, hair tinting lotions, creams, nail polishes and sun protection preparations. The latter can be in the usual forms, such as, for example, as W/O or O/W emulsions, solutions, gels, creams, lotions or sprays. The comb copolymers can advantageously be used in dispersions for producing these preparations. Said dispersions can contain the usual carrier media in cosmetics, such as water, castor oils or silicone oils, and solid substances, for example, organic and inorganic pigments such as titanium dioxide or iron oxide.

Finally, such a dispersant can also be used for preparing a pigmented coating on a substrate, wherein the pigment lacquer is applied to the substrate, and wherein the pigment lacquer applied to the substrate is burned in or cured, or crosslinked.

The comb copolymers can be used alone or together with conventional binders. When used in polyolefins, it can be advantageous, for example, to use corresponding low molecular weight polyolefins as carrier materials together with the copolymer according to the invention.

A possible use of the comb copolymers consists of the preparation of dispersible solid substances in powder particle and/or fiber particle form, in particular dispersible pigments or plastic filler substances, wherein the particles are coated with the comb copolymer. Such coatings of organic and also of inorganic solid substances are implemented in a known manner. Here, the solvent or emulsifier can either be removed or remain in the mixture with formation of pastes. These pastes are conventional commercial products and they can additionally contain binder proportions as well as additional auxiliary substances and additives. In the case of pigments in particular, the coating of the pigment surface can occur during or after the synthesis of the pigments, for example, by adding the copolymers to the pigment suspension, either during or after the pigment finishing. The pigments that have undergone a preliminary treatment in this manner are characterized by the property of being easier to incorporate as well as by improved viscosity, flocculation and gloss behaviors and by higher color strengths in comparison to untreated pigments.

Examples of pigments are mono-, di-, tri- and polyazo pigments; oxazine, dioxazine, thiazine pigments; diketopyrrolopyrroles, phthalocyanines, ultramarine and other metal complex pigments; indigoid pigments; diphenylmethane, triarylmethane, xanthene, acridine, quinacridone, and methine pigments; anthraquinone; and pyranthrone, perylene and other polycyclic carbonyl pigments. Additional examples of inorganic pigments can be found in the monograph: W. Herbst, K. Hunger "Industrial Organic Pigments," 1997 (Publisher: Wiley-VCH, ISBN: 3-527-28836-8). Examples of inorganic pigments are pigments based on soot, graphite, zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth-vanadate-molybdate yellow or chromium titanium yellow). Additional examples are mentioned in the monograph: G. Buxbaum "Industrial Inorganic Pigments," 1998 (Publisher: Wiley-VCH, ISBN: 3-527-28878-3). Inorganic pigments can also be magnetic pigments based on pure iron, iron oxides and chromium oxides or mixed oxides, metallic pigments made of aluminum, zinc, copper or brass as well as pearlescent pigments, fluorescent and phosphorescent luminous pigments. Additional examples are nanoscale organic or inorganic solid substances having particle sizes of less than 100 nm, such as certain soot types, or particles consisting of a metal or semi-metal oxide or hydroxide, as well as particles consisting of mixed metal and/or semimetal oxides or hydroxides. For example, the oxides and/or oxide hydroxides of aluminum, silicon, zinc, titanium, etc., can be used for the preparation of such extremely fine-particle solid substances. The manufacturing process of these oxidic or hydroxidic or oxide hydroxidic particles can be carried out using a great variety of methods such as, for example, ion exchange processes, plasma processes, sol-gel methods, precipitation, comminution (for example, by grinding) or flame hydrolysis, etc. These nanoscale solid substances can also be so-called hybrid particles which consists of an inorganic core and an organic envelope, or vice versa.

Examples of powder or fibrous fillers are, for example, those that are constructed from powder or fibrous particles of aluminum oxide, aluminum hydroxide, silicon dioxide, diatomaceous earth, siliceous earth, quartz, silica gel, talc, kaolin, mica, perlite, feldspar, slate powder, calcium sulfate, barium sulfate, calcium carbonate, calcite, dolomite, glass, polyvinylene difluoride (PVDF) or carbon. Additional examples of pigments or fillers can be found, for example, in EP-A-0 270 126. Flame protection agents, such as, for example, aluminum or magnesium hydroxide, and matting agents, such as silicic acids, for example, are also easy to disperse and stabilize.

Moreover, the copolymer according to the invention can also be used as emulsifier and compatibilizer (liquid/liquid compatibilizer).

The invention is explained in further detail below using embodiment examples.

Starting Substances:

Synthetic resin SMA 2000 SMA copolymer with a styrene content of 66 mole percent, pyridine acid number=335; manufacturer Cray Valley Jeffamine M 2070 Polyether monoamine with terminal primary amino group, molar ratio of ethylene oxide to propylene oxide repeated units approximately 31/10, amine number=27; manufacturer Hunstman Jeffamine M 2005 Polyether monoamine with terminal primary amino group, molar ratio of ethylene oxide to propylene oxide repeated units approximately 6/29, amine number=25; manufacturer Huntsman MPEG 750 Polyethylene glycol monomethyl ether, molecular weight approximately 750, OH number=75; manufacturer BASF Polyester PE Caprolactone polyester from WO 2009/103381, intermediate product A1, OH number=51

Polysiloxane S α-Butyldimethylsiloxy-ω-(3-(2-hydroxyethoxyl)propyl))-polydimethylsiloxane, $M_n$=4670 g/mol, OH number=12; from Sigma-Aldrich Grilonit RV 1814 Alkyl glycidyl ether, manufacturer EMS Chemie Uniox Mus 15 α-Methyl-ω-(2-propenyloxyl)poly(oxy-1,2-ethanediyl), manufacturer NOF Measurement Methods Gel Permeation Chromatography (GPC)

The gel permeation chromatography was carried out at 40° C. with a high-pressure fluid chromatography pump (Bischoff HPLC 2200) and a refractive index detector (Waters 419). As eluent, tetrahydrofuran was used at an elution rate of 1 mL/min. The calibration was carried out with polystyrene standard. The number-average molecular weight Mn, the weight-average molecular weight Mw, and the polymolecularity index PMI=Mw/Mn were calculated using the program NTeqGPC.

Solid Matter

Approximately 2 g of sample are weighed in a previously weighed aluminum dish and dried for 30 minutes at 150° C. in the drying cabinet, cooled in the exsiccator, and then weighed again. The residue corresponds to the solid matter content.

Hydroxy Number

Alcoholic hydroxyl groups are converted by acetylation with an excess of acetic acid anhydride. Subsequently, the excess acetic acid anhydride is cleaved off by water addition to form acetic acid and back titrated with ethanolic KOH. The OH number gives the quantity of KOH in mg equivalent to the quantity of acetic acid bound in the acetylation of 1 g substance.

Amine Number

The amine number (AmN) refers to the quantity of KOH in mg that corresponds to the amine content of 1 g of substance. The mean number is determined according to DIN 16945 by a neutralization reaction with 0.1N perchloric acid in acetic acid as titration agent:

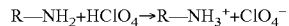

The additions of inert solvents, such as cyclohexane, dioxane, chlorobenzene, acetone, methyl ethyl ketone, can improve the titration of very weak bases.

Acid Number

The acid number (AN) refers to the quantity of KOH in mg that is required for the neutralization of 1 g of substance under the established conditions. The acid number is determined according to DIN EN ISO 2114 by a neutralization reaction with 0.1N KOH in ethanol as titration agent:

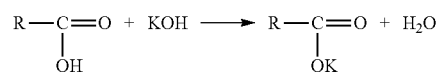

Total Acid Number

The total acid number (TAN) refers to the quantity of KOH in mg that is required for the neutralization of 1 g substance under the established conditions. Here, both the acid groups and also the acid anhydride groups are included.

The total acid number is determined according to DIN EN ISO 2114 by a neutralization reaction with 0.1N KOH in ethanol as titration agent.

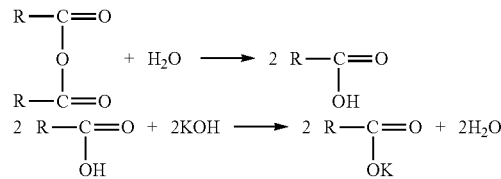

Different Main Chains

Polymer 1: 0 Mole Percent Succinic Acid Diamide Structure (0 Mole Percent Structural Unit I), 90% Quat (i.e., 90 Mole Percent of the Tertiary Amino Groups Quaternized) (Comparison Example Relative to Polymer 3-6)

47.5 g synthetic resin SMA 2000 (TAN=335/141.5 mmol anhydride groups) are dissolved in 50 g methoxypropyl acetate and slowly mixed with 47.2 mmol Jeffamin M 2070 (AmN=27.0) at 110° C. After 30 min, 94.3 mmol N,N-dimethylaminopropylamine (AmN=1105) are metered in and reacted for 2 h at 130° C. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.

$AmN_{(theo.)}$=17
$AmN_{(measured)}$=17
$AN_{(measured)}$=4

100 g of the polymer solution are reacted at 120° C. with 3.5 g benzyl chloride for 4 h and adjusted with butyl glycol to a solid matter (solid matter content) of 50%.

Polymer 2: 100 Mole Percent Succinic Acid Diamide Structure (Structural Unit I), Amine; 0% Quat (i.e., 0 Mole Percent of the Tertiary Amino Groups Quaternized) (Comparison Example Relative to Polymer 3-6)

47.5 g synthetic resin SMA 2000 (TAN=335/141.5 mmol anhydride groups) are dissolved in 50 g methoxypropyl acetate and mixed slowly with 47.2 mmol Jeffamin M 2070 (AmN=27.0) at 110° C. After 30 min, 235.9 mmol N,N- dimethylaminopropylamine (AmN=1105) are metered in and reacted for 2 h at 130° C. Thereafter, the temperature is increased to 170° C. and the reaction is continued for an additional 4 h, wherein after 2 h a vacuum is applied in addition. In the process, the methyl propyl acetate and the reaction water are removed by distillation.

The reaction product is dissolved to 50% in butyl glycol.
$AmN_{(theo.)}=40$
$AmN_{(measured)}=40$
$AN_{(measured)}=1$ Polymer 3: 100 Mole Percent Succinic Acid Diamide Structure (Structural Unit I), 90% Quat;

100 g of the polymer solution Polymer 2 are reacted at 120° C. with 8 g benzyl chloride for 4 h and adjusted to a solid matter content of 50% with butyl glycol.

Polymer 4: 100 Mole Percent Succinic Acid Diamide Structure, 45% Quat;

100 g of the polymer solution Polymer 2 are reacted at 120° C. with 4 g benzyl chloride for 4 h and adjusted to a solid matter content of 50% with butyl glycol.

Polymer 5: 100 Mole Percent Succinic Acid Diamide Structure, 23% Quat;

100 g of the polymer solution Polymer 2 are reacted at 120° C. with 2 g benzyl chloride for 4 h and adjusted to a solid matter content of 50% with butyl glycol.

Polymer 6: 100 Mole Percent Succinic Acid Diamide Structure, 11% Quat;

100 g of the polymer solution Polymer 2 are reacted at 120° C. with 1 g benzyl chloride for 4 h and adjusted to a solid matter content of 50% with butyl glycol.

Polymer 7: 0 Mole Percent Succinic Acid Diamide Structure, 35% Quat;
(Comparison Example Relative to Polymer 8-11)

47.5 g synthetic resin SMA 2000 (TAN=335/141.5 mmol anhydride groups) are dissolved in 50 g methoxypropyl acetate and mixed slowly with 70.8 mmol Jeffamin M 2070 (AmN=27.0) at 110° C. After 30 min, 70.8 mmol N,N-dimethylaminopropylamine (AmN=1105) are metered in and reacted at 130° C. for 2 h. Subsequently, the temperature is increased to 170° C., and the reaction is continued for an additional 4 h, wherein after 2 h, a vacuum is applied in addition. In the process, the methoxypropyl acetate and reaction water are removed by distillation.
$AmN_{(theo.)}=20$
$AmN_{(measured)}=20$
$AN_{(measured)}=7$ 80 g of the polymer are reacted at 120° C. with 25.1 mmol benzoic acid and 25.1 mmol Grilonit RV1814 (EG=283 g/mol) for 4 h.

Polymer 8: 5 Mole Percent Succinic Acid Diamide Structure, 35% Quat;

47.5 g synthetic resin SMA 2000 (TAN=335/141.5 mmol anhydride groups) are dissolved in 50 g methoxypropyl acetate and mixed slowly with 70.8 mmol Jeffamin M 2070 (AmN=27.0) at 110° C. After 30 min, 77.8 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the methoxypropyl acetate and reaction water are removed by distillation.
$AmN_{(theo.)}=22$
$AmN_{(measured)}=22$
$AN_{(measured)}=7$ 80 g of the polymer are reacted at 120° C. with 27.7 mmol benzoic acid and 27.7 mmol Grilonit RV1814 (EG=283 g/mol) for 4 h.

Polymer 9: 10 Mole Percent Succinic Acid Diamide Structure, 35% Quat;

47.5 g synthetic resin SMA 2000 (TAN=335/141.5 mmol anhydride groups) are dissolved in 50 g methoxypropyl acetate and mixed slowly with 70.8 mmol Jeffamin M 2070 (AmN=27.0) at 110° C. After 30 min, 84.9 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the methoxypropyl acetate and reaction water are removed by distillation.
$AmN_{(theo.)}=24$
$AmN_{(measured)}=24$
$AN_{(measured)}=19.7$ 80 g of the polymer are reacted at 120° C. with 30.1 mmol benzoic acid and 30.1 mmol Grilonit RV1814 (EG=283 g/mol) for 4 h.

Polymer 10: 15 Mole Percent Succinic Acid Diamide Structure, 35% Quat;

47.5 g synthetic resin SMA 2000 (TAN=335/141.5 mmol anhydride groups) are dissolved in 50 g methoxypropyl acetate and mixed slowly with 70.8 mmol Jeffamin M 2070 (AmN=27.0) at 110° C. After 30 min, 92.0 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the methoxypropyl acetate and reaction water are removed by distillation.
$AmN_{(theo.)}=26$
$AmN_{(measured)}=26$
$AN_{(measured)}=6$ 80 g of the polymer are reacted at 120° C. with 32.6 mmol benzoic acid and 32.6 mmol Grilonit RV1814 (EG=283 g/mol) for 4 h.

Polymer 11: 100 Mole Percent Succinic Acid Diamide Structure, 76% Quat;

47.5 g synthetic resin SMA 2000 (TAN=335/141.5 mmol anhydride groups) are dissolved in 50 g methoxypropyl acetate and mixed slowly with 70.8 mmol Jeffamin M 2070 (AmN=27.0) at 110° C. After 30 min, 92.0 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the methoxypropyl acetate and reaction water are removed by distillation.
$AmN_{(theo.)}=55$
$AmN_{(measured)}=57$
$AN_{(measured)}=1$ 80 g of the polymer are reacted at 120° C. with 70.6 mmol benzoic acid and 70.6 mmol Grilonit RV1814 (EG=283 g/mol) for 4 h.

Polymer 12: 100 Mole Percent Succinic Acid Diamide Structure, 43% Quat;

47.5 g synthetic resin SMA 2000 (TAN=335/141.5 mmol anhydride groups) are dissolved in 50 g methoxypropyl acetate and mixed slowly with 46.7 mmol Jeffamin M 2070 (AmN=27.0) at 110° C. After 30 min, 236 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the methoxypropyl acetate and reaction water are removed by distillation.

AmN$_{(theo.)}$=79
AmN$_{(measured)}$=79
AN$_{(measured)}$=1

80 g of the polymer are reacted at 120° C. with 101.4 mmol benzoic acid and 101.4 mmol Grilonit RV1814 (EG=283 g/mol) for 4 h.

Polymer 13: Block Copolymer with pMMA-b-pSMA, 100 Mole Percent Structural Unit I, 40% Quat;

Step a:

In a round-bottom flask with reflux cooler, temperature sensor and CPG stirrer, under a nitrogen atmosphere, 59.1 g 2,4-diphenyl-4-methyl-1-pentene and 132.3 g 1-methoxy-2-propyl acetate are placed as starting materials and heated under stirring at 130° C. Subsequently, within 90 min, 250.3 g methyl methacrylate with 3.3 g 2,2'-azodi(2-methylbutyronitrile) are metered in. The reaction mixture is stirred for an additional 3 h (product: M$_n$=630, M$_w$=2900).

Step b:

In a round-bottom flask with reflux cooler, temperature sensor and CPG stirrer, under a nitrogen atmosphere, 100.00 g of the product of step a) are placed as starting material and heated under stirring at 130° C. Subsequently, within 60 min, in parallel 1.) 27.6 g MSA with 1.5 g 2,2'-azodi(2-methylbutyronitrile) in 55.5 g 1-methoxy-2-propyl acetate as well as 2.) 29.4 g styrene are metered in. The reaction mixture is stirred for an additional 5 h. (solid substance: 60% product: M$_n$=1900, M$_w$=5400).

Step c):

50 g step b (64 mmol anhydride groups) are mixed slowly with 40 mmol Jeffamin M 2070 (AmN=27.0) at 110° C. After 30 min, 88 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
AmN$_{(theo.)}$=20
AmN$_{(measured)}$=21
AN$_{(measured)}$=2

100 g of the polymer solution are reacted at 120° C. with 2 g benzyl chloride for 4 h and the solid matter content is adjusted to 50% with butyl glycol.

Polymer 14: Copolymer of MSA and Dodecene, 50 Mole Percent Structural Unit I; 57% Quat Step a:

Into a round-bottom flask with reflux cooler, temperature sensor and CPG stirrer, under nitrogen atmosphere, 84.2 g 1-dodecene and 25.5 g xylene are filled and heated at 140° C. under stirring. Subsequently, in portions, 7 times every, 30 minutes, 7.00 g MSA as well as in each case 1 g di-tert-butyl peroxide are added in parallel. The reaction mixture is stirred for an additional 3 h at 140° C. Since the resulting product solidifies, 82.00 g xylene are subsequently added. One gets a clear, yellow, medium-viscosity fluid (57% solution; M$_n$=2500, M$_w$=7100).

Step b:

100 g step b (200 mmol anhydride groups) are added slowly with 200 mmol Jeffamin M 2070 (AmN=27.0) at 110° C. After 30 min, 100 mmol N,N-dimethylaminopropylamine (AmN=1105) are metered in and reacted at 130° C. for 2 h. Subsequently, the temperature is increased to 170° C. and the reaction is continued for an additional 4 h, wherein after 2 h a vacuum is applied in addition. In the process, the xylene and reaction water are removed by distillation.

The reaction product is dissolved to 50% in butyl glycol.
AmN$_{(theo.)}$=6
AmN$_{(measured)}$=8
AN$_{(measured)}$=3

100 g of the polymer solution are reacted at 120° C. with 1 g benzyl chloride for 4 h and adjusted to a solid matter content of 50% with butyl glycol.

Polymer 15: Copolymer of MSA and Allyl Polyether, Molar 1.8:1; 35 Mole Percent Structural Unit I; 20% Quat Step a:

In a round-bottom flask with reflux cooler, temperature sensor and CPG stirrer, under nitrogen atmosphere, 130 g Uniox Mus 15 and 60.00 1-methoxy-2-propyl acetate are placed as starting substances and heated under stirring at 130° C. Subsequently, 20.7 g maleic acid anhydride with 1.84 g 2,2'-azodi(2-methylbutyronitrile) in 94 g 1-methoxypropyl acetate are metered in within 90 minutes. The reaction mixture is stirred in addition for a total of 2 h at 130° C., during which time a reinitiation is carried out 3 times each time with 0.50 g 2,2'-azodi(2-methylbutyronitrile). One gets a clear, yellow, low-viscosity fluid (50% solution; M$_n$=4200, M$_w$11,300).

Step b:

100 g step a (67 mmol anhydride groups) are mixed slowly with 90 mmol N,N-dimethylaminopropylamine at 130° C. and reacted for 2 h. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
AmN$_{(theo.)}$=43
AmN$_{(measured)}$=45
AN$_{(measured)}$=2

100 g of the polymer solution are reacted at 120° C. with 2 g benzyl chloride for 4 h and the solid matter content is adjusted to 50% with butyl glycol.

Different Amines/Quaternary Ammonium Salts

Polymer 16: Dimethylaminoethanol, 100 Mole Percent Structural Unit I, 22% Quat;

47.5 g synthetic resin SMA 2000 (TAN=335/141.5 mmol anhydride groups) are dissolved in 50 g methoxypropyl acetate and mixed slowly with 47.2 mmol Jeffamin M 2070 (AmN=27.0) at 110° C. After 30 min, 235.9 mmol N,N-dimethylaminoethanol are metered in and reacted at 130° C. for 2 h. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
AmN$_{(theo.)}$=41
AmN$_{(measured)}$=41
OHN$_{(measured)}$=3
AN$_{(measured)}$=3

100 g of the polymer solution are reacted at 120° C. with 2 g benzyl chloride for 4 h and the solid matter content is adjusted to 50% with butyl glycol.

Polymer 17: N-(3-Aminopropyl)Imidazole, 100 Mole Percent Structural Unit I, 56% Quat;

47.5 g synthetic resin SMA 2000 (TAN=335/141.5 mmol anhydride groups) are dissolved in 50 g methoxypropyl acetate and mixed slowly with 47.2 mmol Jeffamin M 2070 (AmN=27.0) at 110° C. After 30 min, 235.9 mmol N-(3-aminopropyl)imidazole are metered in and reacted at 130° C. for 2 h. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
$AmN_{(theo.)}=38$
$AmN_{(measured)}=39$
$AN_{(measured)}=1$ 100 g of the polymer solution are reacted at 120° C. with 5 g benzyl chloride for 4 h and the solid matter content is adjusted to 50% with butyl glycol.

Polymer 18: 4-Aminomethylpyridine, 100 Mole Percent Structural Unit I, 11% Quat;

47.5 g synthetic resin SMA 2000 (TAN=335/141.5 mmol anhydride groups) are dissolved in 50 g methoxypropyl acetate and mixed slowly with 47.2 mmol Jeffamin M 2070 (AmN=27.0) at 110° C. After 30 min, 235.9 mmol 4-aminomethylpyridine are metered in and reacted at 130° C. for 2 h. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
$AmN_{(theo.)}=40$
$AmN_{(measured)}=41$
$AN_{(measured)}=2$ 100 g of the polymer solution are reacted at 120° C. with 1 g benzyl chloride for 4 h and the solid matter content is adjusted to 50% with butyl glycol.

Polymer 19: Quaternization with o-Cresyl Glycidyl Ether, 100 Mole Percent Structural Unit I, 60% Quat;

47.5 g synthetic resin SMA 2000 (TAN=335/141.5 mmol anhydride groups) are dissolved in 50 g methoxypropyl acetate and mixed slowly with 47.2 mmol Jeffamin M 2070 (AmN=27.0) at 110° C. After 30 min, 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
$AmN_{(theo.)}=40$
$AmN_{(measured)}=40$
$AN_{(measured)}=1$ 100 g of the polymer solution are reacted at 120° C. with 7.1 g o-cresyl glycidyl ether and 5.4 g benzoic acid for 4 h and the solid matter content is adjusted to 50% with butyl glycol.

Polymer 20: Quaternization with Styrene Oxide, 100 Percent Structural Unit I, 61% Quat;

47.5 g synthetic resin SMA 2000 (TAN=335/141.5 mmol anhydride groups) are dissolved in 50 g methoxypropyl acetate and mixed slowly with 47.2 mmol Jeffamin M 2070 (AmN=27.0) at 110° C. After 30 min, 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein after 2 h a vacuum is applied in addition. In the process, the methoxypropyl acetate and reaction water are removed by distillation.

The reaction product is dissolved to 50% in butyl glycol.
$AmN_{(theo.)}=40$
$AmN_{(measured)}=40$
$AN_{(measured)}=1$ 100 g of the polymer solution are reacted at 120° C. with 5 g styrene oxide and 5.3 g benzoic acid for 4 h and the solid matter content is adjusted to 50% with butyl glycol.

Different Side Chains

Polymer 21: Jeffamin M 2005, 100 Mole Percent Structural Unit I, 83% Quat;

47.5 g synthetic resin SMA 2000 (TAN=335/141.5 mmol anhydride groups) are dissolved in 50 g methoxypropyl acetate and mixed slowly with 47.2 mmol Jeffamin M 2005 (AmN=25) at 110° C. After 30 min, 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein, after 2 h, a vacuum is applied in addition. In the process, the methoxypropyl acetate and reaction water are removed by distillation.

The reaction product is dissolved to 50% in butyl glycol.
$AmN_{(theo.)}=37$
$AmN_{(measured)}=37$
$AN_{(measured)}=1$ 100 g of the polymer solution are reacted at 120° C. with 7 g benzyl chloride for 4 h, and the solid matter content is adjusted to 50% with butyl glycol.

Polymer 22: Jeffamin M 2070/MPEG 750, 100 Mole Percent Structural Unit I, 49% Quat;

47.5 g synthetic resin SMA 2000 (TAN=335/141.5 mmol anhydride groups) are dissolved in 50 g methoxypropyl acetate and mixed slowly with 27.2 mmol Jeffamin M 2070 (AmN=27.0) and 20 mmol MPEG 750 at 110° C. After 30 min, 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein, after 2 h, a vacuum is applied in addition. In the process, the methoxypropyl acetate and reaction water are removed by distillation.

The reaction product is dissolved to 50% in butyl glycol.
$AmN_{(theo.)}=46$
$AmN_{(measured)}=46$
$OHN_{(measured)}=1$
$AN_{(measured)}=1$ 100 g of the polymer solution are reacted at 120° C. with 5 g benzyl chloride for 4 h, and the solid matter content is adjusted to 50% with butyl glycol.

Polymer 23: MPEG 750, 100 Mole Percent Structural Unit I, 58% Quat;

47.5 g synthetic resin SMA 2000 (TAN=335/141.5 mmol anhydride groups) are dissolved in 50 g methoxypropyl acetate, 0.5 g potassium carbonate is added, and the reaction mixture is reacted for 3 h with 47.2 mmol MPEG 750 at 130° C. The OH number after the reaction is 2 mg KOH/g. Subsequently, 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein, after 2 h, a vacuum is applied in addition. In the process, the methoxypropyl acetate and reaction water are removed by distillation.

The reaction product is dissolved to 50% in butyl glycol.
$AmN_{(theo.)}=62$
$AmN_{(measured)}=61$
$OHN_{(measured)}=1$
$AN_{(measured)}=2$ 100 g of the polymer solution are reacted at 120° C. with 8 g benzyl chloride for 4 h, and the solid matter content is adjusted to 50% with butyl glycol.

Polymer 24: Jeffamin M 2070/Polyester, 100 Mole Percent Structural Unit I, 50% Quat;

47.5 g synthetic resin SMA 2000 (TAN=335/141.5 mmol anhydride groups) are dissolved in 50 g methoxypropyl acetate and mixed slowly with 27.2 mmol Jeffamin M 2070 (AmN=27.0) and 20 mmol polyester PE at 110° C. After 30 min 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein, after 2 h, a vacuum is applied in addition. In the process, the methoxypropyl acetate and reaction water are removed by distillation.

The reaction product is dissolved to 50% in butyl glycol.

$AmN_{(theo.)}=44$
$AmN_{(measured)}=45$
$OHN_{(measured)}=2$
$AN_{(measured)}=2$ 100 g of the polymer solution are reacted at 120° C. with 5 g benzyl chloride for 4 h, and the solid matter content is adjusted to 50% with butyl glycol.

Polymer 25: Jeffamin M 2005/Polysiloxane, 100 Mole Percent Structural Unit I, 63% Quat;

47.5 g synthetic resin SMA 2000 (TAN=335/141.5 mmol anhydride groups) are dissolved in 50 g methoxypropyl acetate and mixed slowly with 42.2 mmol Jeffamin M 2005 and 5 mmol polysiloxane S at 110° C. After 30 min 235.9 mmol N,N-dimethylaminopropylamine (AmN=1105) are metered in and reacted at 130° C. for 2 h. Thereafter, the temperature is increased to 170° C. and the reaction is continued for an additional 4 h, wherein, after 2 h, a vacuum is applied in addition. In the process, the methoxypropyl acetate and reaction water are removed by distillation.

The reaction product is dissolved to 50% in butyl glycol.

$AmN_{(theo.)}=35$
$AmN_{(measured)}=36$
$OHN_{(measured)}=1$
$AN_{(measured)}=2$ 100 g of the polymer solution are reacted at 120° C. with 5 g benzyl chloride for 4 h, and the solid matter content is adjusted to 50% with butyl glycol.

Polymer 26: No Side Chain, 100 Mole Percent Structural Unit I, 5% Quat;

47.5 g synthetic resin SMA 2000 (TAN=335/141.5 mmol anhydride groups) are dissolved in 50 g methoxypropyl acetate and 100 g butyl diglycol acetate and heated at 50° C. Subsequently, 283 mmol N,N-dimethylaminopropylamine (AmN=1105) are slowly metered in and the reaction mixture is reacted at 130° C. for 2 h. Thereafter, the temperature is increased to 170° C. and the reaction is continued for an additional 4 h, wherein, after 2 h, a vacuum is applied in addition. In the process, the methoxypropyl acetate and reaction water are removed by distillation.

The polymer solution is adjusted to a solid matter content of 50% with butyl diglycol acetate.

$AmN_{(theo.)}=132$
$AmN_{(measured)}=131$
$AN_{(measured)}=1$ 100 g of the polymer solution are reacted at 120° C. with 1 g benzyl chloride and salted with 75 g Disperbyk 111 and the solid matter content is adjusted to 50% with 75 g butyl diglycol acetate.

c) Application Technology Testing

Use of the Polymers According to the Invention as Wetting and Dispersing Agents for the Preparation of Pigment Concentrates and their Use in Lacquer Systems Starting substances FPD binder Benzyl methacrylate-methacrylic acid copolymer, 35% in methoxypropyl acetate, acid number 53, from Byk-Chemie Vinnol E 15/45 Copolymer of vinyl chloride and vinyl acetate from Wacker Chemie Ebecryl 81 Amine-modified polyester acrylate from Cytec Ebecryl 450 Fatty acid-modified polyester hexaacrylate from Cytec Irgacure 2022 Photoinitiator from BASF Irgacure 2100 Photoinitiator from BASF BYK 085 Silicon-containing polymer defoamer from BYK-Chemie BYK 377 Silicon-containing surface additive from BYK-Chemie BYK UV 3510 Silicon-containing surface additive from BYK-Chemie Spezial Schwarz [Special Soot pigment from Evonik Black] 250

Chromophtal Red A3B Amino anthraquinone pigment from BASF

Novoperm yellow PM3R Isoindolin pigment from Clariant

Irgalith Rubine L4BH Azo pigment from BASF

Sun fast Blue 249-5412 Phthalocyanine pigment from Sun Chemicals

PMA Methoxypropyl acetate

Preparation of a Color Resist Pigment Concentrate

| | |
|---|---|
| FPD binder | 7.14 |
| PMA | 30.86 |
| W + DA [Wetting and Dispersing Agent] | 4.50 |
| Chromophtal Red A3B | 7.5 |
| | 50.00 |

Dispersion with Lau Paint Shaker DAS H [/A]200-K: ratio of ground material to zirconium beads (0.4-0.6 mm diameter): 1:2 (parts by weight), 300 min, cooling step 3, normal speed.

The viscosity measurements were carried out with the Stresstech apparatus of Reologica Instruments AB. In the process, the cylinder measurement system CC 25 was used. The equilibration time before the start of the measurement was 5 s. 12 measurement points were recorded at a shearing rate of 100 1/s with a total measurement duration of 48 s at a measurement temperature of 25° C. The indicated viscosity value is the mean value of the last 10 measurement points.

The transparency was evaluated visually: 1-5, 1=very good, 5=very poor

Result

| W + DA | Viscosity immediate | Transparency immediate | Viscosity 14 d/40° C. | Transparency 14 d/40° C. |
|---|---|---|---|---|
| Polymer 1 | 16.9 mPas | 2 | 17.5 mPas | 2 |
| Polymer 2 | 25.5 mPas | 4 | 59.1 mPas | 4 |
| Polymer 3 | 13.6 mPas | 1 | 13.8 mPas | 1 |
| Polymer 4 | 14.3 mPas | 1 | 14.8 mPas | 1 |
| Polymer 5 | 15.4 mPas | 1 | 16.3 mPas | 1 |
| Polymer 6 | 19.8 mPas | 2 | 28.6 mPas | 2 |

The results show that with the polymer 3 according to the invention, a lower-viscosity and more storage-stable pigment dispersion compared to Polymer 1 is obtained. Moreover, a transparent lacquer film is obtained. In the variation of the quaternization degree, the quaternized wetting and dispersing agents (Polymer 3-6) showed better results than the unquaternized comparison product Polymer 2.

Preparation of Pigmented Inkjet Inks

|  | Special Black 250 | Novoperm yellow PM3R |
|---|---|---|
| Butyl glycol acetate | 34.25 | 36.25 |
| Cyclohexanone | 3.00 | 3.00 |
| Vinnol E 15/45 | 0.75 | 0.75 |
| W + DA | 6.0 | 5.0 |
| Pigment | 6.0 | 5.0 |
|  | 50.00 | 50.00 |

Dispersion with Lau Paint Shaker DAS H [/A]200-K: ratio of ground material to zirconium beads (0.4-0.6 mm diameter): 1:2 (parts by weight), 960 min, cooling step 3, normal speed.

The viscosity measurements were carried out with the Stresstech apparatus of Reologica Instruments AB. In the process, the cylinder measurement system CC 25 was used. The equilibration time before the start of the measurement was 5 s. 12 measurement points were recorded at a shearing rate of 100 1/s with a total measurement duration of 48 s at a measurement temperature of 25° C. The indicated viscosity value is the mean value of the last 10 measurement points.

The transparency was evaluated visually: 1-5, 1=very good, 5=very poor

Result
Spezial Schwarz 250

| W + DA | Viscosity immediate | Transparency immediate | Viscosity 14 d/40° C. | Transparency 14 d/40° C. |
|---|---|---|---|---|
| Polymer 1 | 8.5 mPas | 5 | 11.1 mPas | 5 |
| Polymer 3 | 8.5 mPas | 2 | 10.3 mPas | 2 |

Novoperm Yellow PM3R

| W + DA | Viscosity immediate | Transparency immediate | Viscosity 14 d/40° C. | Transparency 14 d/40° C. |
|---|---|---|---|---|
| Polymer 1 | 10.1 mPas | 2 | 19.8 mPas | 2 |
| Polymer 3 | 7.9 mPas | 1-2 | 7.9 mPas | 1-2 |

The results show that, with the polymer 3 according to the invention, a lower-viscosity and more storage-stable pigment dispersion is obtained in comparison to Polymer 1. Moreover, a transparent lacquer film is obtained.

Preparation of Pigmented UV Printing Inks
Pigment Concentrate:

|  | Irgalith L4BH | Sun fast Blue 249-5412 | Spezial Schwarz 250 |
|---|---|---|---|
| Ebecryl 81 | 66.6 | 66.6 | 45.78 |
| Ebecrytl 450 | 10.3 | 10.3 | 18.7 |
| W + DA | 3.0 | 3.0 | 4.25 |
| Byk-085 | 0.1 | 0.1 | 1 |
| Pigment | 20.0 | 20.0 | 30.0 |

Dispersion with Dispermat CV: Ratio of ground material to glass beads (1 mm diameter): 1:1 (parts by weight), 30 min, 40° C., 10,000 rpm.

Printing Ink:

| Ebecryl 81 | 89.80 | 89.80 | 79.9 |
|---|---|---|---|
| Byk-377 | 0.20 | 0.20 |  |
| Byk UV 3510 |  |  | 0.1 |
| Irgacure 2022 | 10.0 | 10.0 |  |
| Irgacure 2100 |  |  | 20.0 |

Lacquer Preparation:

| Pigment concentrate | 6.0 | 6.0 | 5.0 |
|---|---|---|---|
| Lacquer | 4.0 | 4.0 | 5.0 |

After complete drying, the gloss was measured using a "Micro Tri Gloss" gloss measurement apparatus (Manufacturer: BYK Gardner, Geretsried) under angles of 20°.

The viscosity and color strengths were evaluated visually: 1-5, 1=very good, 5=very poor Results:
Sun Fast Blue 249-5412

| W + DA | Viscosity PC immediate | Color strength immediate | Gloss immediate 20° | Viscosity PC 5 d/40° C. | Color strength 5 d/40° C. |
|---|---|---|---|---|---|
| Polymer 7 | 1 | 1 | 54 | 4 | 2 |
| Polymer 8 | 1 | 1 | 59 | 3 | 1-2 |
| Polymer 9 | 1 | 1 | 60 | 2 | 1 |
| Polymer 10 | 1 | 1 | 61 | 2 | 1 |
| Polymer 11 | 1 | 1 | 65 | 2 | 1 |
| Polymer 12 | 1 | 1 | 62 | 2 | 1 |

Irgalith L4BH

| W + DA | Viscosity PC immediate | Color strength immediate | Gloss immediate 20° | Viscosity PC 5 d/40° C. | Color strength 5 d/40° C. |
|---|---|---|---|---|---|
| Polymer 7 | 3/2 | 2 | 60 | 5 | 3 |
| Polymer 8 | 2 | 2 | 61 | 3 | 2 |
| Polymer 9 | 2 | 2 | 62 | 3 | 2 |
| Polymer 10 | 2 | 2 | 63 | 3 | 2 |
| Polymer 11 | 2 | 2 | 64 | 3 | 2 |
| Polymer 12 | 2 | 2 | 63 | 3 | 2 |

Spezial Schwarz 250

| W + DA | Viscosity PC immediate | Color strength immediate | Gloss immediate 20° | Viscosity PC 5 d/40° C. | Color strength 5 d/40° C. |
|---|---|---|---|---|---|
| Polymer 7 | 2 | 2 | 7 | 3 | 3 |
| Polymer 8 | 1 | 1 | 7 | 2 | 2 |
| Polymer 9 | 1 | 1 | 8 | 2 | 1 |
| Polymer 10 | 1 | 1 | 9 | 2 | 1 |
| Polymer 11 | 1 | 1 | 8 | 2 | 1 |
| Polymer 12 | 1 | 1 | 8 | 2 | 1 |

The results show that, with copolymers 8-12 according to the invention, which contain bisamide structures, pigmented lacquers with improved properties in terms of viscosity, storage stability, gloss and color strength are obtained in comparison to Polymer 7 which contains no bisamide structures.

The invention claimed is:

1. A copolymer containing
   i) 40-73 mole percent of a base structural unit (A) and
   ii) 27-60 mole percent of a substituted dicarboxylic acid derivative structural unit (B), wherein the base structural unit (A) is generated by reacting a monomer (a) containing an olefinic double bond as well as no species falling under the dicarboxylic acid derivative structural unit (B), wherein the substituted dicarboxylic acid derivative structural unit (B) is present according to one or more of the general formulas of the group consisting of (I-1), (I-2), (I-3), (I-4), (I-5), (I-6), (II-1), (II-2), (II-3), (III-1), (III-2), (III-3), (IV-1) and (IV-2)

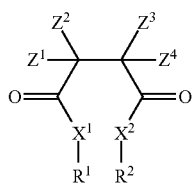
I-1

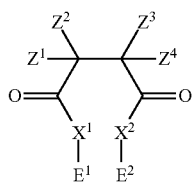
I-2

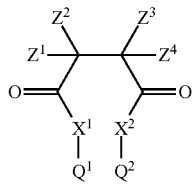
I-3

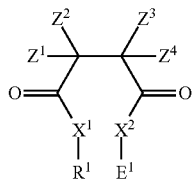
I-4

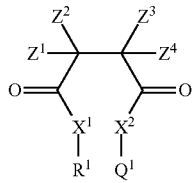
I-5

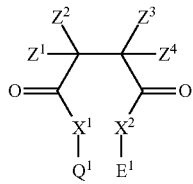
I-6

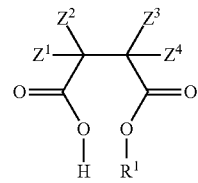
II-1

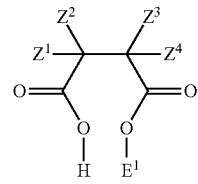
II-2

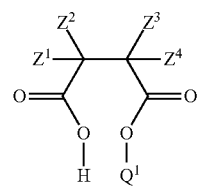
II-3

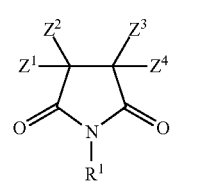
III-1

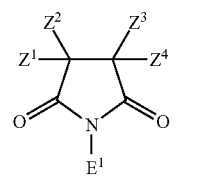
III-2

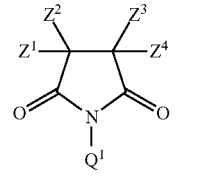
III-3

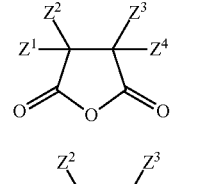
IV-1

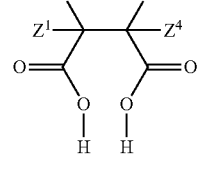
IV-2 with
Z1, Z2, Z3 and Z4 in each case identical or different and in each case independently of one another represented by hydrogen, a linear $C_1$-$C_4$ alkyl residue and/or polymer main chain linking sites, with the condition that, for each general formula, there are exactly two polymer main chain linking sites, $X^1$ and $X^2$ in each case identical or different and in each case independently of one another represented by NH and/or O, $R^1$ and $R^2$ in each case identical or different and in each case independently of one another represented by a branched or unbranched, saturated or unsaturated, organic residue containing at least four carbon atoms as well as at least three oxygen atoms, and which comprises no amine functions and no ammonium functions, $E^1$ and $E^2$ in each case identical or different and in each case independently of one another represented by an N,N-disubstituted amine residue of general formula (V-E)

(V-E)

with $R^{11}$, $R^{12}$ in each case identical or different and in each case independently of one another represented by a substituted or unsubstituted, branched or unbranched, $C_1$-$C_{24}$ alkyl group, by a substituted or unsubstituted $C_4$-$C_{10}$ cycloalkyl group, by a substituted or unsubstituted $C_6$-$C_{18}$ aryl group and/or a substituted or unsubstituted, branched or unbranched $C_7$-$C_{18}$ arylalkyl group, where $R^{11}$ and $R^{12}$ together with the N atom binding $R^{11}$ and $R^{12}$ can form an aromatic or aliphatic, substituted or unsubstituted, cyclic $C_3$-$C_{10}$ group, Y identical or different and represented by a substituted or unsubstituted, branched or unbranched, $C_1$-$C_{24}$ alkylene group and/or a substituted or unsubstituted $C_6$-$C_{18}$ arylene group $Q^1$ and $Q^2$ in each case identical or different and in each case independently of one another represented by a quaternary ammonium residue of general formula (V-Q)

(V-Q)

with $R^{11}$, $R^{12}$ of the same equivalence as in the general formula (V-E), Y of the same equivalence as in the general formula (V-E), $R^{13}$ identical or different and represented by hydrogen, by a substituted or unsubstituted, branched or unbranched, $C_1$-$C_{24}$ alkyl group, by a substituted or unsubstituted $C_4$-$C_{10}$ cycloalkyl group, by a substituted or unsubstituted $C_6$-$C_{18}$ aryl group and/or a substituted or unsubstituted, branched or unbranched, $C_7$-$C_{18}$ arylalkyl group, $M^-$ identical or different and represented by an anion, wherein the molar fraction of the structural units that are part of the group consisting of (I-1), (I-2), (I-3), (I-4), (I-5) and (I-6) is 10-80%, relative to the totality of the structural units to be attributed to the dicarboxylic acid derivative structural unit (B), the molar fraction of the structural units that are part of the group consisting of (I-2), (I-3), (I-4), (I-5), (I-6), (II-2), (II-3), (III-2) and (III-3) is 10-90%, relative to the totality of the structural units to be attributed to the dicarboxylic acid derivative structural unit (B), and, regarding the dicarboxylic acid derivative structural unit (B), the molar fraction of the substituents that are part of the group consisting of $Q^1$ and $Q^2$ is 20-95%, relative to the totality of the substituents that are part of the group consisting of $E^1$, $E^2$, $Q^1$ and $Q^2$.

2. The copolymer according to claim 1 containing,
 i) 48-70 mole percent of the base structural unit (A) and
 ii) 30-52 mole percent of the substituted dicarboxylic acid derivative structural unit (B).

3. The copolymer according to claim 1, characterized in that the monomer (a) that produces the base structural unit (A) and contains an olefinic double bond is selected from one or more of the monomers of the group consisting of alkyl(meth)acrylates of straight-chain, branched or cycloaliphatic monoalcohols having 1 to 22 carbon atoms or of aromatic or straight-chain or branched mixed aromatic-aliphatic monoalcohols having 1 to 22 carbon atoms, alkenyl (meth)acrylates of straight-chain, branched or cycloaliphatic monoalcohols having 1 to 22 carbon atoms or of aromatic or straight-chain or branched mixed aromatic-aliphatic monoalcohols having 1 to 22 carbon atoms, mono(meth)acrylates of oligomeric or polymeric ethers, (meth)acrylates of halogenated alcohols; oxirane-containing (meth)acrylates, styrene, substituted styrenes, α-olefins, vinyl ethers, allyl ethers; methacrylonitrile, acrylonitrile; cycloaliphatic heterocyclic compounds comprising vinyl groups and having at least one N-atom as ring member, vinyl esters of monocarboxylic acids having 1 to 20 carbon atoms, N-alkyl- and N,N-dialkyl-substituted acrylamides with straight-chain, branched or cycloaliphatic alkyl groups having 1-22 carbon atoms, ethylenically unsaturated monomers with at least one carboxylic acid, phosphonic acid, phosphoric acid or sulfonic acid group and unsaturated fatty acids.

4. The copolymer according to claim 1, characterized in that at least 60 mole percent of the structural units that are part of the base structural unit (A) are produced by reaction with styrene.

5. The copolymer according to claim 1, characterized in that $M^-$ is present as carboxylate, as phosphate, as phosphate monoester, as phosphate diester, as alkyl sulfonate, as sulfate and/or as halide.

6. The copolymer according to claim 1, containing 12-500 structural units which are selected from the base structural unit (A) and the dicarboxylic acid derivative structural unit (B).

7. A method of preparing the copolymer according to claim 1, characterized in that first a copolymer precursor is produced by polymerization, wherein, by subsequent grafting, the structural units (I-1), (I-2), (I-3), (I-4), (I-5), (I-6), (II-1), (II-2), (II-3), (III-1), (III-2), and/or (III-3) of the dicarboxylic acid derivative structural unit (B) are formed.

8. The method according to claim 7, characterized in that the subsequent grafting is carried out by the use of procedures that get rid of reaction water, optionally by heating to a temperature from 120 to 200° C., until the molar fraction of the structural units which are part of the group consisting of (I-1), (I-2), (I-3), (I-4), (I-5) as well as (I-6), relative to the totality of the structural units that are to be attributed to the dicarboxylic acid derivative structural unit (B) is at least 5%.

9. Dispersion, which contains a dispersant medium as well as a dispersed particulate solid substance, which is optionally present in the form of an inorganic filler, and/or in the form of an inorganic or organic pigment and/or in the form of carbon nanotubes and/or in the form of graphenes, wherein, relative to the weight of the dispersion, 0.1 to 10 wt % of a copolymer according to claim 1 is used as wetting and dispersing agents.

10. The dispersion according to claim 9, which is present as ink or coating agent, optionally as lacquer.

11. Particle preparation containing 30.0 to 99.9 wt % particulate solid as well as 0.1-70.0 wt % of a copolymer according to claim 1.

12. A method comprising stirring or admixing the copolymer according to claim 1, as wetting and/or dispersing agent in a carrier medium, in a solid substance compressed cake containing organic solvent, plasticizer and/or water, or in a solvent-free manner.

13. The dispersion according to claim 9, wherein, relative to the weight of the dispersion, 0.3 to 4.5 wt % of the copolymer is used as wetting and dispersing agents.

14. The copolymer according to claim 1 containing,
 i) 50-67 mole percent of the base structural unit (A) and
 ii) 33-50 mole percent of the substituted dicarboxylic acid derivative structural unit (B).

15. The copolymer according to claim 1, characterized in that
 the molar fraction of the structural units that are part of the group consisting of (I-1), (I-2), (I-3), (I-4), (I-5) and (I-6) is 27-75%, relative to the totality of the structural units to be attributed to the dicarboxylic acid derivative structural unit (B),
 the molar fraction of the structural units that are part of the group consisting of (I-2), (I-3), (I-4), (I-5), (I-6), (II-2), (II-3), (III-2) and (III-3) is 20-80%, relative to the totality of the structural units to be attributed to the dicarboxylic acid derivative structural unit (B), and,
 regarding the dicarboxylic acid derivative structural unit (B), the molar fraction of the substituents that are part of the group consisting of $Q^1$ and $Q^2$ is 25-90%, relative to the totality of the substituents that are part of the group consisting of $E^1$, $E^2$, $Q^1$ and $Q^2$.

16. The copolymer according to claim 1, containing 20-200 structural units which are selected from the base structural unit (A) and the dicarboxylic acid derivative structural unit (B).

17. A copolymer containing
 i) 40-73 mole percent of a base structural unit (A) and
 ii) 27-60 mole percent of a substituted dicarboxylic acid derivative structural unit (B), wherein the base structural unit (A) is generated by reacting a monomer (a) containing an olefinic double bond as well as no species falling under the dicarboxylic acid derivative structural unit (B),
 wherein the substituted dicarboxylic acid derivative structural unit (B) is present according to one or more of the general formulas of the group consisting of (I-1), (I-2), (I-3), (I-4), (I-5), (I-6), (II-1), (II-2), (II-3), (III-1), (III-2), (III-3), (IV-1) and (IV-2)

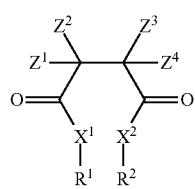

I-1

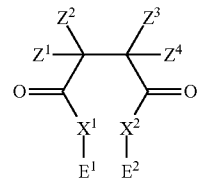

I-2

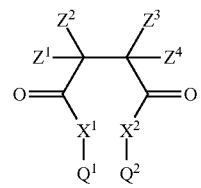

I-3

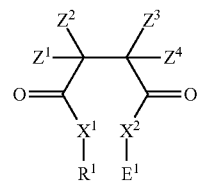

I-4

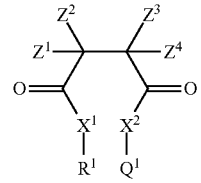

I-5

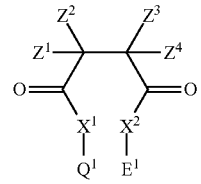

I-6

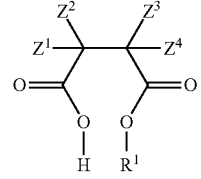

II-1

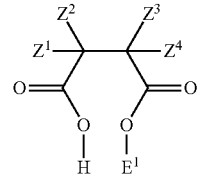

II-2

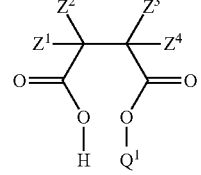

II-3

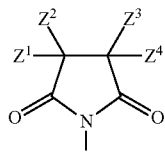

III-1

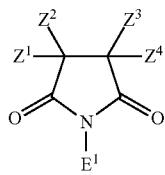

III-2

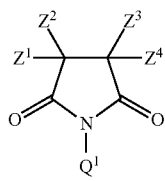

III-3

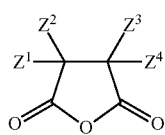

IV-1

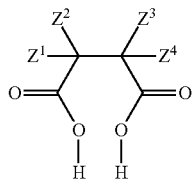

IV-2 with
- Z1, Z2, Z3 and Z4 in each case identical or different and in each case independently of one another represented by hydrogen, a linear $C_1$-$C_4$ alkyl residue and/or polymer main chain linking sites, with the condition that, for each general formula, there are exactly two polymer main chain linking sites,
- $X^1$ and $X^2$ in each case identical or different and in each case independently of one another represented by NH and/or O,
- $R^1$ and $R^2$ in each case identical or different and in each case independently of one another represented by a branched or unbranched, saturated or unsaturated, organic residue containing at least four carbon atoms as well as at least three oxygen atoms, and which comprises no amine functions and no ammonium functions,
- $E^1$ and $E^2$ in each case identical or different and in each case independently of one another represented by an N,N-disubstituted amine residue of general formula (V-E)

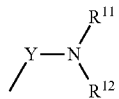

(V-E)

with
- $R^{11}$, $R^{12}$ together with the N atom binding $R^{11}$ and $R^{12}$ forming an aromatic or aliphatic, substituted or unsubstituted, heterocyclic compound, which comprises in total two N atoms,
- Y identical or different and represented by a substituted or unsubstituted, branched or unbranched, $C_1$-$C_{24}$ alkylene group and/or a substituted or unsubstituted $C_6$-$C_{18}$ arylene group
- $Q^1$ and $Q^2$ in each case identical or different and in each case independently of one another represented by a quaternary ammonium residue of general formula (V-Q)

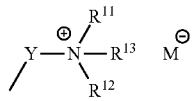

(V-Q)

with
- $R^{11}$, $R^{12}$ of the same equivalence as in the general formula (V-E),
- Y of the same equivalence as in the general formula (V-E),
- $R^{13}$ identical or different and represented by hydrogen, by a substituted or unsubstituted, branched or unbranched, $C_1$-$C_{24}$ alkyl group, by a substituted or unsubstituted $C_4$-$C_{10}$ cycloalkyl group, by a substituted or unsubstituted $C_6$-$C_{18}$ aryl group and/or a substituted or unsubstituted, branched or unbranched, $C_7$-$C_{18}$ arylalkyl group,
- $M^-$ identical or different and represented by an anion,
- wherein the molar fraction of the structural units that are part of the group consisting of (I-1), (I-2), (I-3), (I-4), (I-5) and (I-6) is 5-100%, relative to the totality of the structural units to be attributed to the dicarboxylic acid derivative structural unit (B),
- the molar fraction of the structural units that are part of the group consisting of (I-2), (I-3), (I-4), (I-5), (I-6), (II-2), (II-3), (III-2) and (III-3) is 5-100%, relative to the totality of the structural units to be attributed to the dicarboxylic acid derivative structural unit (B), and,
- regarding the dicarboxylic acid derivative structural unit (B), the molar fraction of the substituents that are part of the group consisting of $Q^1$ and $Q^2$ is 10-100%, relative to the totality of the substituents that are part of the group consisting of $E^1$, $E^2$, $Q^1$ and $Q^2$.

* * * * *